US008264149B2

(12) United States Patent
George et al.

(10) Patent No.: US 8,264,149 B2
(45) Date of Patent: Sep. 11, 2012

(54) LAMP ASSEMBLY WITH LED AND FLUORESCENT LAMP

(75) Inventors: John M. George, Peabody, MA (US); Heinz W. Ito, Topsfield, MA (US); Robert Y. Pai, Ft. Lauderdale, FL (US)

(73) Assignee: Osram Sylvania Inc., Danvers, MA (US)

( * ) Notice: Subject to any disclaimer, the term of this patent is extended or adjusted under 35 U.S.C. 154(b) by 180 days.

(21) Appl. No.: 12/745,015

(22) PCT Filed: Feb. 23, 2009

(86) PCT No.: PCT/US2009/034877
§ 371 (c)(1),
(2), (4) Date: May 27, 2010

(87) PCT Pub. No.: WO2009/111201
PCT Pub. Date: Sep. 11, 2009

(65) Prior Publication Data
US 2010/0315011 A1 Dec. 16, 2010

Related U.S. Application Data

(60) Provisional application No. 61/067,567, filed on Feb. 29, 2008.

(51) Int. Cl.
*H05B 35/00* (2006.01)
*H05B 37/00* (2006.01)

(52) U.S. Cl. .............................. 315/32; 315/182; 362/240

(58) Field of Classification Search .............. 315/185 R, 315/32, 312, 200 A, 56, 58, 246, 216, 182; 362/240, 231, 221, 222, 396
See application file for complete search history.

(56) References Cited

U.S. PATENT DOCUMENTS

| 6,400,104 B1 * | 6/2002 | Ham .............................. 315/312 |
| 7,484,860 B2 * | 2/2009 | Demarest et al. ............. 362/253 |
| 2002/0118538 A1 * | 8/2002 | Calon et al. .................... 362/236 |
| 2005/0195600 A1 | 9/2005 | Porchia et al. |
| 2006/0139927 A1 * | 6/2006 | Kovacik et al. ............... 362/260 |
| 2006/0238136 A1 | 10/2006 | Johnson, III et al. |

FOREIGN PATENT DOCUMENTS

WO 99/53236 A1 10/1999

OTHER PUBLICATIONS

International Search Report for PCT/US09/34877, Performed at European Patent Office, Rijswijk, The Netherlands, complete on Sep. 10, 2009, mailed on Sep. 17, 2009.

* cited by examiner

*Primary Examiner* — Daniel D Chang
(74) *Attorney, Agent, or Firm* — Shaun P. Montana

(57) ABSTRACT

A lamp assembly includes a lamp base having power input terminals, a fluorescent lamp connected to the terminals through a manually operated switch that is on an exterior of the lamp base so that when power is supplied to the terminals the fluorescent lamp is selectively powered by manual operation of the switch, and a light emitting diode (LED) inseparably connected to the terminals so that when power is supplied to the terminals the LED is always powered. This arrangement allows the LED to be ON regardless of the operating status of the fluorescent lamp and allows the fluorescent lamp to be turned OFF while the LED remains ON.

12 Claims, 4 Drawing Sheets

LAMP ASSEMBLY WITH LED AND FLUORESCENT LAMP

CROSS-REFERENCE TO RELATED APPLICATIONS

The present application claims priority of U.S. Provisional Application 61/067,567 filed Feb. 29, 2008, and PCT Application No. PCT/US2009/034877 filed Feb. 23, 2009, the entire contents of both of which are hereby incorporated by reference.

TECHNICAL FIELD

The present invention is directed to a combination lamp that includes a compact fluorescent lamp for normal illumination and a light emitting diode (LED) for reduced illumination.

BACKGROUND

This type of combination lamp is known and sold, for example, under the trademark Duled® by Osram Sylvania. Combination lamps that provide both normal and reduced illumination are also disclosed in U.S. Pat. No. 6,400,104 (Ham), U.S. Pat. No. 7,246,919 (Porchia et al.), and U.S. Pat. No. 7,318,659 (Demarest et al.) These combination lamps provide an alternative to single purpose lamps and find use, for example, as a lamp for normal illumination that can also function as a low intensity night light.

Nevertheless, the known combination lamps can be improved by simplifying the change between reduced and full illumination. Known combination lamps switch between normal illumination and reduced illumination by cycling the input power switch. The user may be required to cycle power and wait a certain time before re-applying power to change the operating mode. This may be confusing to a casual user as the expected operating mode is not immediately forthcoming. In some instances, the user may have to wait in the dark for several seconds before re-applying power to change the operating mode, which can pose safety concerns. By way of further example, when the combination lamp is used on a child's nightstand, the child may have to get out of bed and walk to a wall switch to obtain the full illumination.

It is also desirable to provide some light when the lamp providing full illumination fails. LEDs last significantly longer than compact fluorescent lamps and having the LED remain ON when the compact fluorescent has failed would provide an important source of emergency light in certain applications.

SUMMARY

An object of the present invention is to provide a novel lamp assembly that avoids the problems of the prior art by providing a fluorescent lamp that operates independently of the LED, where the LED is always ON when power is supplied to the assembly.

A further object of the present invention is to provide a novel lamp assembly that includes a lamp base having power input terminals, a fluorescent lamp connected to the terminals through a manually-operated switch that is on an exterior of the lamp base so that when power is supplied to the terminals the fluorescent lamp is selectively powered by manual operation of the switch, and an LED inseparably connected to the terminals so that when power is supplied to the terminals the LED is always powered. This arrangement allows the LED to be ON regardless of the operating status of the fluorescent lamp and the fluorescent lamp to be turned OFF while the LED remains ON.

These and other objects and advantages of the invention will be apparent to those of skill in the art of the present invention after consideration of the following drawings and description of preferred embodiments.

DETAILED DESCRIPTION

Figure 1:
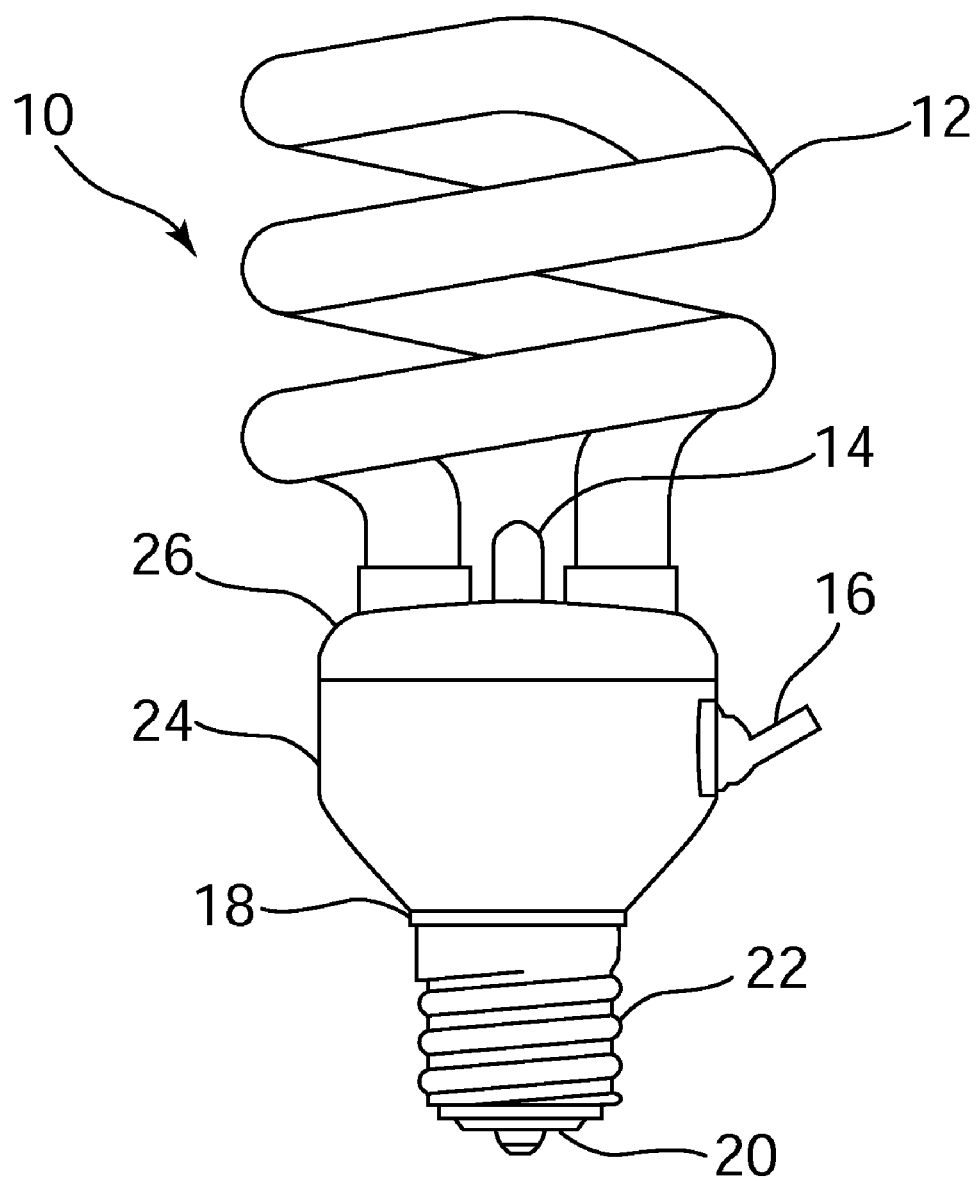
FIG. 1 is pictorial representation of an embodiment of the lamp assembly of the present invention.

With reference now to FIG. 1, a lamp assembly 10 of the present invention is a combination of a fluorescent lamp 12 and at least one light emitting diode (LED) 14, where the LED 14 is always ON when power is supplied to the assembly, and where the fluorescent lamp 12 has a switch 16 that controls power supply only to the fluorescent lamp 12.

The lamp assembly 10 also includes a lamp base 18 having power input terminals 20, where the LED 14 is inseparably connected to the power input terminals 20 so that when power is supplied to the power input terminals the LED 14 is always powered. Inseparable means that the connection between the LED 14 and the power input terminals 20 does not include a switch or other disconnection device so that the LED 14 cannot be disconnected from the power input terminals in normal operation of the device. A driver may be connected between the power input terminals and the LED to provide the necessary voltage to the LED (e.g., low voltage DC). More than one LED 14 may be provided and LED colors may be selected depending on the intended use and desired lighting effect.

Figure 2:
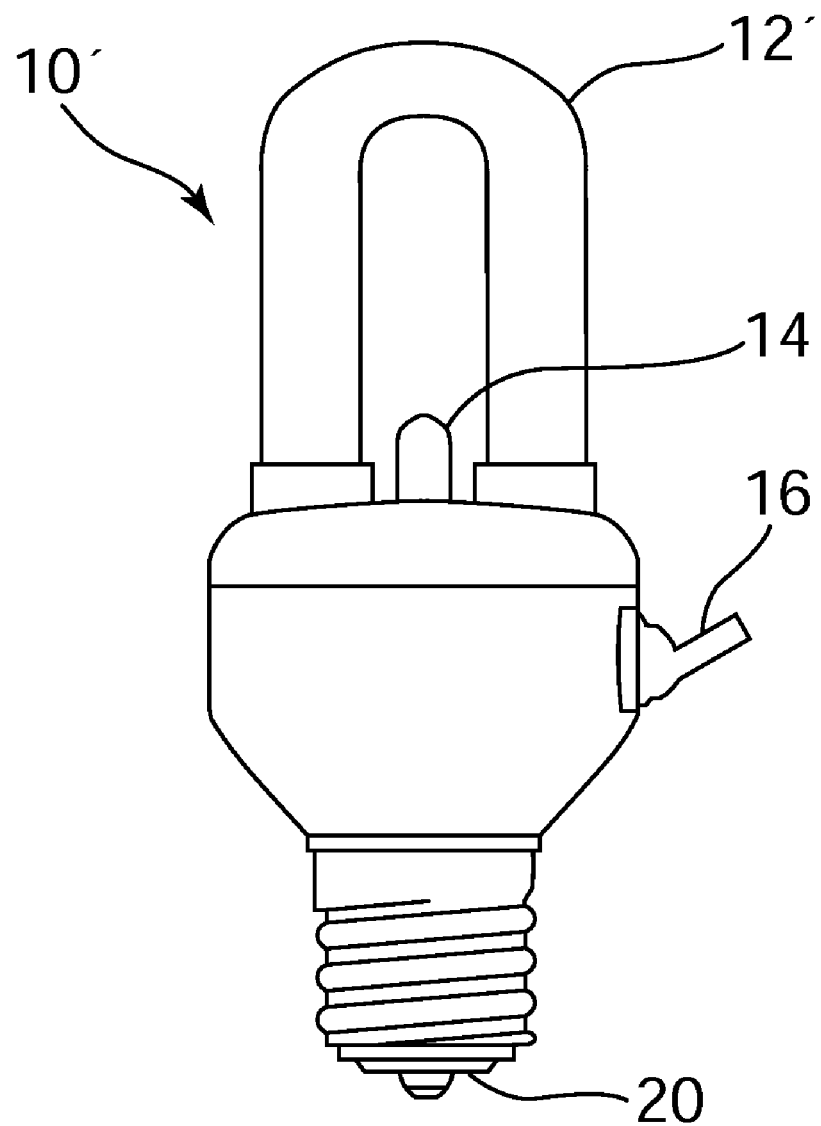
FIG. 2 is pictorial representation of a further embodiment of the lamp assembly of the present invention.

The fluorescent lamp 12 is connected to the power input terminals 20 through the switch 16, where the switch 16 is on an exterior of the lamp base 18, so that when power is supplied to the power input terminals 20 the fluorescent lamp 12 is selectively powered by operation of the switch 16. The switch 16 only controls the supply of power to the fluorescent lamp 12. The fluorescent lamp 12 extends from the lamp base 18 and the LED 14 extends from the lamp base 18 adjacent to the fluorescent lamp 12. The fluorescent lamp 12 may be a full or partial spiral compact fluorescent lamp, such as shown in FIG. 1 where the LED 14 is inside a circumference of the spiral, or may be a compact fluorescent lamp of another shape, such as the U-shape compact fluorescent lamp 12' in the embodiment of lamp assembly 10' in FIG. 2.

The power input terminals 20 may be part of a threaded mount 22 and the lamp base 18 may include a housing 24 with a top 26 opposite the threaded mount, where the fluorescent lamp 12 and LED 14 extend from the top 26 and the switch 16 extends from a peripheral side of the housing 24.

The switch 16 may be a conventional manually operated switch, such as a single pole, single throw switch with a toggle arm that projects in a direction transverse to a longitudinal axis of the lamp assembly 10.

Figure 3:
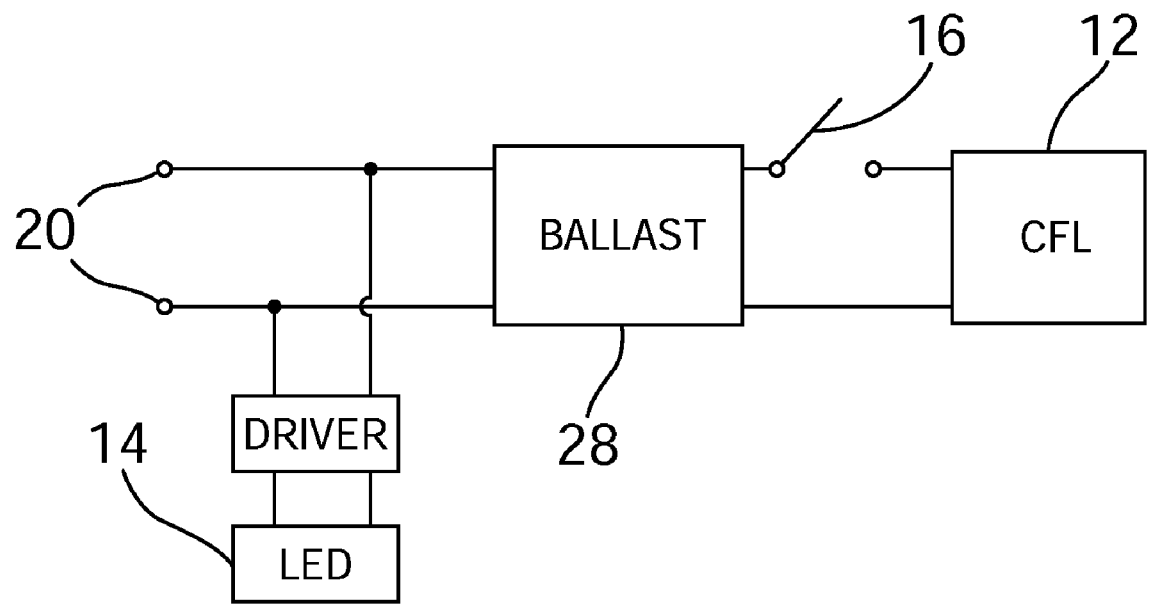
FIG. 3 is a schematic circuit diagram of an embodiment of an operating circuit for the present invention.
Figure 4:
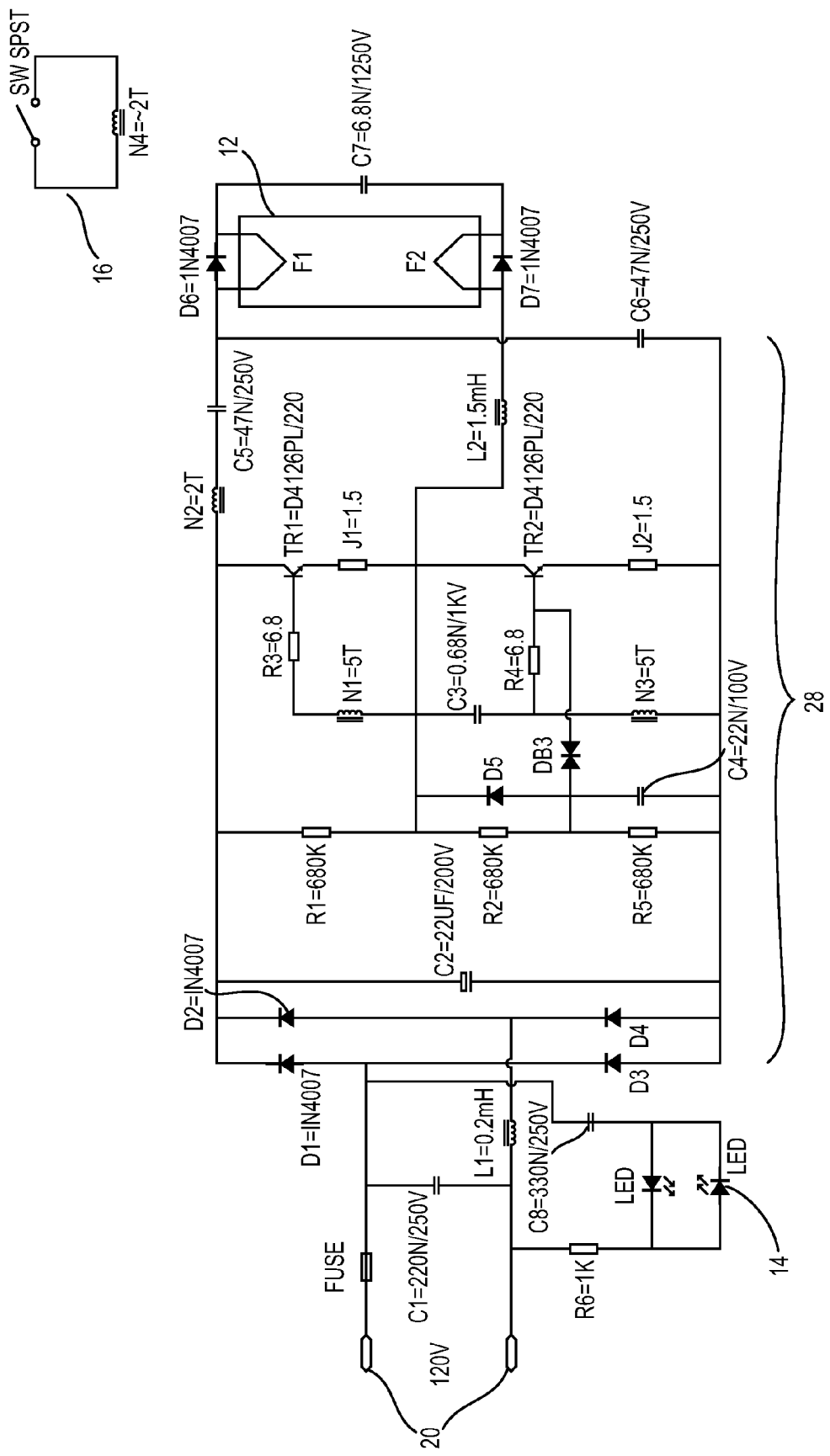
FIG. 4 is a more detailed diagram of the operating circuit of FIG. 3 showing representative components.

With reference now to FIGS. 3-4, the circuit for the lamp assembly includes conventional fluorescent lamp ballast 28 between the power input terminals 20 and the switch 16. As is apparent, the LED 14 is inseparably connected to the power input terminals (there are no switches or other disconnection devices) so that the LED 14 is always ON when power is supplied to the power input terminals 20. A driver may be provided as needed so that LED receives the proper voltage. The fluorescent lamp 12 is separated from the power input terminals 20 by the switch 16 and the ballast 28, where the switch 16 controls power only to the fluorescent lamp 12 so that when power is supplied to the power input terminals 20 the fluorescent lamp 12 is selectively powered by manual operation of the switch 16. The particular circuit components shown in FIG. 4 are representative as suitable for a Sylvania T2 23 Watt compact fluorescent lamp and the invention is not limited to these components. Further, the circuit may be modified, such as by connecting the LED circuitry directly to the DC bus, without departing from the invention.

The operation of switch 16 in this embodiment is based on the principle of the ideal toroid transformer. In a toroid transformer with plural separate windings, when one winding is shorted, the other windings on the same core are effectively shorted as well. As the magnetic resistance of the ferrite used is very low compared to free air, the toroid transformer used in the present combination lamp behaves like an ideal transformer in the relevant frequency range.

In this embodiment, a transformer is provided with four sets of turns N1, N2, N3, and N4, where turns N1 and N3 provide a feedback voltage to transistors TR1 and TR2 to create the oscillations necessary for operation of the fluorescent lamp 12. The turns N4 are only connected to the switch 16; they have no galvanic connection to any other parts of the circuit, including those carrying high voltage. When N4 is shorted by operation of switch 16, turns N1 and N3 are effectively shorted as well and no longer provide feedback voltage to the transistors TR1 and TR2. This stops oscillations in the circuit and the fluorescent lamp 12 turns OFF. This arrangement provides several advantages; smaller switches can used, safety is improved because the switch 16 is not directly connected to other parts of the circuit, switch life is increased because the load is low, and there is less radio frequency interference than with a direct connection.

While embodiments of the present invention have been described in the foregoing specification and drawings, it is to be understood that the present invention is defined by the following claims when read in light of the specification and drawings.

What is claimed is:

1. A lamp assembly that is a combination of a fluorescent lamp and a light emitting diode (LED), comprising at least one LED that is always ON when power is supplied to the assembly, and the fluorescent lamp with a switch that controls power supply only to said fluorescent lamp, and further comprising a transformer with first turns that carry a feedback voltage for operation of said fluorescent lamp and with second turns that are electrically connected only to said switch so that operation of said switch shorts said second turns, thereby stopping operation of said fluorescent lamp.

2. The lamp assembly of claim 1, further comprising a lamp base having power input terminals, where said LED is inseparably connected to said power input terminals so that when power is supplied to said power input terminals said LED is always powered.

3. The lamp assembly of claim 2, wherein said fluorescent lamp is connected to said power input terminals through said switch that is on an exterior of said lamp base so that when power is supplied to said power input terminals said fluorescent lamp is selectively powered by operation of said switch.

4. The lamp assembly of claim 1, further comprising a lamp base having power input terminals, wherein said fluorescent lamp is connected to said power input terminals through said switch that is on an exterior of said lamp base.

5. The lamp assembly of claim 4, wherein said power input terminals are part of a threaded mount and said lamp base includes a housing with a top opposite said threaded mount, and wherein said fluorescent lamp and said LED extend from the top and said switch extends from a peripheral side of said housing.

6. The lamp assembly of claim 1, further comprising a lamp base having power input terminals,
wherein said fluorescent lamp extends from said lamp base and is connected to said power input terminals through said switch, said switch being on an exterior of said lamp base and manually operated so that when power is supplied to said power input terminals said fluorescent lamp is selectively powered by manual operation of said switch, and
wherein said LED extends from said lamp base adjacent to said fluorescent lamp and is inseparably connected to said power input terminals so that when power is supplied to said power input terminals said LED is always powered.

7. The lamp assembly of claim 6, further comprising a ballast circuit that is inside said lamp base and connected between said power input terminals and said switch.

8. The lamp assembly of claim 6, wherein said fluorescent lamp and said LED extend from a top of said lamp base opposite said power input terminals at a bottom of said lamp base, and said switch extends from a side of said lamp base between said top and said power input terminals.

9. The lamp assembly of claim 6, wherein said switch is a single pole, single throw switch with a toggle arm that projects in a direction transverse to a longitudinal axis of the assembly.

10. The lamp assembly of claim 6, wherein said fluorescent lamp is a spiral compact fluorescent lamp and said LED is inside a circumference of the spiral.

11. The lamp assembly of claim 6, wherein said fluorescent lamp is a U-shaped compact fluorescent lamp and said LED is inside the U-shape.

12. The lamp assembly of claim 6, wherein said power input terminals are part of a threaded mount and said lamp base includes a housing with a top opposite said threaded mount, and wherein said fluorescent lamp and said LED extend from the top and said switch extends from a peripheral side of said housing.

* * * * *